Feb. 2, 1943.  L. W. RYAN ET AL  2,309,988
METHOD OF TREATING TITANIUM SULPHATE SOLUTIONS
Filed April 4, 1939
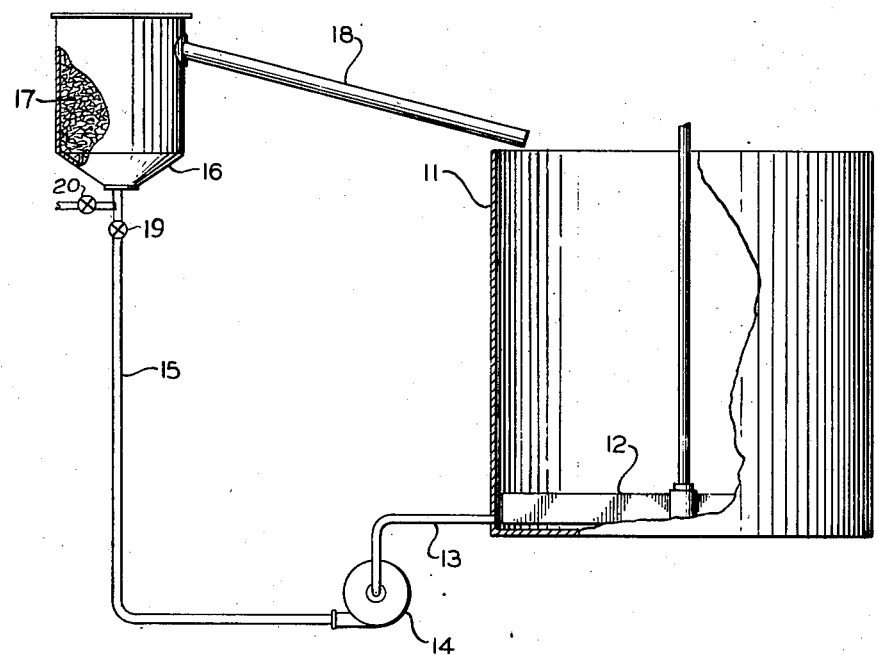
INVENTORS
LONNIE W. RYAN
BY WINFRED J. CAUWENBERG
ATTORNEY Patented Feb. 2, 1943

2,309,988

UNITED STATES PATENT OFFICE 2,309,988

METHOD OF TREATING TITANIUM SULPHATE SOLUTIONS

Lonnie W. Ryan, Westfield, N. J., and Winfred Joseph Cauwenberg, Piney River, Va., assignors to Interchemical Corporation, New York, N. Y., a corporation of Ohio Application April 4, 1939, Serial No. 265,944

3 Claims. (Cl. 23—117)

This invention relates to the manufacture of titanium pigments from titanium sulphate solutions containing iron, and has particular reference to a new method of reducing the ferric iron content of such solutions to the ferrous state.

In the preferred commercial methods for the manufacture of titanium pigments, ilmenite ores and concentrates containing both iron and titanium, are put into solution by means of sulphuric acid and water. The resultant solutions containing titanic sulphate, ferric sulphate, ferrous sulphate, and various suspended impurities, vary in composition from basic liquors containing about 75% of theoretical acid to combine with the bases present, up to solutions containing acid in theoretical quantities, or in slight excess. They are then treated with a reducing agent, preferably scrap iron, such as scrap detinned plate, to reduce all of the iron to the ferrous condition, and a small proportion of the titanium to the titanous state. The solutions are then clarified by settling or other means. In processes for the manufacture of pure titanium dioxide a portion of the ferrous sulphate is usually removed by crystallization of the cooled liquor, and the liquor is then usually concentrated by evaporation prior to hydrolysis. In processes for the manufacture of composite titanium dioxide pigments, in which hydrated titanium dioxide is precipitated in the presence of extender pigment, ferrous sulphate is not usually removed and this liquor is not usually concentrated prior to precipitation.

Titanium sulphate solutions are metastable and, upon disturbance, tend to hydrolyze and produce colloidal hydrated titanium dioxide, the presence of which, in uncontrolled amounts, has an adverse effect upon the uniformity of the quality of pigment obtained from these solutions by hydrolytic precipitation and calcination. The stability of the solution is adversely affected particularly by increase in temperature, increase in dilution and increase in basicity.

We have dscovered that the step involving the reduction of the ferric iron to the ferrous state is one in which the stability is likely to be seriously affected, and we have discovered a method of reduction which can be carefully controlled so as to avoid affecting stability.

The method of reducing the iron content of the solution in common use comprises dipping a basket containing scrap iron into a tank containing the solution to be reduced. Another method comprises dumping a sufficient quantity of iron into the batch, and stirring or otherwise maintaining the body of the solution in contact with the iron until reduction occurs. We have learned that these methods tend to produce local overheating of the titanium solution and local reduction of acidity due to the reaction of the iron and the solution and thus tend to set up solutions in which the degree of stability cannot be controlled and which varies from one batch to the next, so that some batches become very metastable and yield pigment of poor properties, while others show metastability to a greater or lesser degree.

We have discovered that if a titanium sulphate liquor be circulated through a mass of reducing agent such as scrap iron, at such a rate of speed that the temperature of the liquid emerging from the reducing agent never reaches the point where a substantial amount of colloidal hydrated titanium dioxide forms, the tendency toward local overheating and local disturbances in acid content is substantiatlly overcome, so that substantially uniform stability of the liquors can be maintained.

A typical unit for the practice of our invention is shown in the accompanying drawing, in which 11 is a storage tank for the liquor, of about 12,000 gallons capacity, provided with a conventional paddle agitator 12. The bottom of the tank is connected by a discharge pipe 13, to a pump 14, which delivers the liquid by means of a pipe 15 to a conical bottomed reduction tower 16, of some 500 gallons capacity, packed with scrap iron 17. The liquid is pumped up through the scrap, and back into the storage tank by means of a large overflow pipe 18. A valve 19 is provided in the pipe 15, just below the tank 16, so that the tank can be shut off from the rest of the system. Just above this valve is placed a valved drain 20, with an outlet to the sewer.

In the practice of the process, we take, for example, 10,000 gallons of a titanium sulphate solution prepared by the sulphuric acid treatment of ilmenite. A typical analysis of such a solution is as follows:

| | |
|---|---|
| Specific gravity | 1.52 |
| Per cent titanium dioxide ($TiO_2$) | 8.6 |
| Per cent ferrous oxide (FeO) | 6.34 |
| Per cent ferric oxide ($Fe_2O_3$) | 2.67 |
| Per cent sulphuric anhydride ($SO_3$) | 25.7 |
| Per cent total sulphuric acid | 31.4 |
| By calculation: | |
| Per cent ferrous sulphate ($FeSO_4$) | 13.4 |
| Per cent ferric sulphate ($Fe_2(SO_4)_3$) | 6.68 |
| Per cent $H_2SO_4$ combined with $TiO_2$ | 17.8 |
| Per cent $H_2SO_4$ required for combination with $TiO_2$ | 21.1 |

Per cent of theoretical acid present $$\frac{17.8}{21.1} \times 100 = 84.4$$

This solution will in ordinary practice, be at a temperature of about 45 to 55° C. The agitator and pump are started, and the solution is pumped through the reducing tower at the rate of about 300 to 350 gallons per minute. By this treatment all of the material pumped through the tower remains in contact with the reducing material for about one and one-half minutes. The circulation is continued until the tank material shows that all of the iron is reduced, together with a portion of the titanium. We prefer to carry the reduction to a titanous sulphate content, calculated as TiO2, of about 6 grams per liter. The pump is then stopped and the solution in the tower is drained rapidly to the storage tank. The valve 19 is then closed and the valve in drain 20 opened, and the tower and the scrap iron remaining in it are washed thoroughly with water before starting reduction of another batch, the wash water being discharged to the sewer. The total conversion time will run from 2 to 3 hours.

It is important that the flow of material through the reducer be kept sufficiently high so that no substantial local overheating or local changes in acidity occurs in the reducing tower. For solutions ordinarily used in preparing pure titanium dioxide, which are considerably basic, the material overflowing from the tower should not exceed a temperature of about 75° C., although our preferred maximum temperature is about 65° C. For normal and slightly acid solutions such as are used in making composite pigments, somewhat higher temperatures are permissible.

We have found that titanium sulphate solutions of other concentrations and of different degrees of acidity show the same improved results when reduced according to our method, which is effective throughout the practical concentration and acidity ranges for iron sulphate titanium sulphate solutions.

In general, we prefer to clarify our titanium liquors before reduction, because of the fact that the clarified liquor is easier to handle in the reducing system.

Other reducing agents may be used to replace the scrap iron, provided they do not produce undesirable soluble material which interferes with the pigment properties of the titanium dioxide. Metallic zinc has proven satisfactory.

We claim:

1. The method of reducing a solution useful in the preparation of hydrolytically precipitated titanium dioxide and containing ferric iron, ferrous iron, titanium and sulphate ions in solution, without substantially increasing the instability of the solution, which comprises circulating the solution from the main body thereof through a body of reducing agent out of contact with the main body of the solution, the reducing agent being one which reacts exothermically with the solution, with the evolution of hydrogen, whereby the acidity is reduced and the ferric iron is reduced to ferrous iron, the circulation being conducted at a sufficiently high rate of speed so that no substantial local overheating or local change in acidity occurs in the body of reducing agent, and the effluent from the reducing agent is at a temperature not exceeding about 75° C., and continuing the circulation until all the ferric iron is reduced, and a portion of the titanium is in the titanous state.

2. The method of reducing a basic titanium sulphate solution useful in the preparation of hydrolytically precipitated titanium dioxide and containing ferric iron, ferrous iron, titanium and sulphate ions in solution, without substantially increasing the instability of the solution, which comprises circulating the solution from the main body thereof through a body of reducing agent out of contact with the main body of the solution, the reducing agent being one which reacts exothermically with the solution, with the evolution of hydrogen, whereby the acidity is reduced and the ferric iron is reduced to ferrous iron, the circulation being conducted at a sufficiently high rate of speed so that no substantial local overheating or local change in acidity occurs in the body of reducing agent, and the effluent from the reducing agent is at a temperature not exceeding about 75° C. and continuing the circulation until all the ferric iron is reduced, and a portion of the titanium is in the titanous state.

3. The method of claim 1 in which the reducing agent is metallic iron.

LONNIE W. RYAN.
WINFRED JOSEPH CAUWENBERG.